US012037853B2

(12) United States Patent
Steele et al.

(10) Patent No.: US 12,037,853 B2
(45) Date of Patent: Jul. 16, 2024

(54) TRAVEL JOINT FOR TUBULAR WELL COMPONENTS

(71) Applicant: Halliburton Energy Services, Inc., Houston, TX (US)

(72) Inventors: David Joe Steele, Carrollton, TX (US); Justin Mark Roberts, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 218 days.

(21) Appl. No.: 17/535,395

(22) Filed: Nov. 24, 2021

(65) Prior Publication Data

US 2022/0170346 A1 Jun. 2, 2022

Related U.S. Application Data

(60) Provisional application No. 63/118,830, filed on Nov. 27, 2020.

(51) Int. Cl.

| | |
|---|---|
| ***E21B 17/02*** | (2006.01) |
| ***E21B 23/12*** | (2006.01) |
| ***E21B 41/00*** | (2006.01) |
| ***E21B 43/14*** | (2006.01) |
| ***H01R 13/26*** | (2006.01) |

(52) U.S. Cl.

CPC ........ *E21B 17/028* (2013.01); *E21B 17/0283* (2020.05); *E21B 23/12* (2020.05); *E21B 41/0035* (2013.01); *E21B 41/0042* (2013.01); *E21B 43/14* (2013.01); *H01R 13/26* (2013.01)

(58) Field of Classification Search

CPC .... E21B 27/028; E21B 17/0283; E21B 23/12; E21B 41/0042; E21B 43/14; E21B 41/0035; H01R 13/26; H01R 13/533

See application file for complete search history.

(56) References Cited

U.S. PATENT DOCUMENTS

| | | | | |
|---|---|---|---|---|
| 4,031,969 | A | 6/1977 | Cullen et al. | |
| 6,776,636 | B1 | 8/2004 | Cameron et al. | |
| 7,228,898 | B2 | 6/2007 | Grigsby et al. | |
| 7,510,003 | B2 | 3/2009 | Meijer et al. | |
| 7,640,977 | B2 * | 1/2010 | Jonas | E21B 17/08 166/242.6 |

(Continued)

FOREIGN PATENT DOCUMENTS

| | | |
|---|---|---|
| AU | 2014400608 | 1/2016 |
| CA | 2898734 | 8/2020 |

(Continued)

OTHER PUBLICATIONS

Manara production and reservoir management system, Schlumberger, 2020.

(Continued)

*Primary Examiner* — Nicole Coy

(74) *Attorney, Agent, or Firm* — Scott Richardson; C. Tumey Law Group, PLLC

(57) ABSTRACT

An apparatus for downhole connection of well components includes a first tubular component defining a through bore for receiving a second tubular component and a travel joint including an axially moveable inner sleeve and a coupling feature configured for coupling the second tubular component with the inner sleeve when received in the through bore of the first tubular component.

20 Claims, 5 Drawing Sheets

(56) References Cited

U.S. PATENT DOCUMENTS

| | | | | |
|---|---|---|---|---|
| 7,735,555 | B2 * | 6/2010 | Patel | E21B 17/028 166/227 |
| 8,056,619 | B2 * | 11/2011 | Patel | E21B 17/028 166/242.7 |
| 10,301,888 | B2 | 5/2019 | Richards et al. | |
| 10,344,570 | B2 * | 7/2019 | Steele | E21B 47/12 |
| 2006/0021799 | A1 | 2/2006 | Hall et al. | |
| 2012/0013482 | A1 * | 1/2012 | Patel | E21B 17/0283 340/854.8 |
| 2012/0305267 | A1 | 12/2012 | Steele | |
| 2015/0009040 | A1 | 1/2015 | Bowles et al. | |
| 2016/0145956 | A1 | 5/2016 | Dahl et al. | |
| 2017/0234113 | A1 | 8/2017 | Steele | |
| 2020/0256128 | A1 | 8/2020 | Cho et al. | |

FOREIGN PATENT DOCUMENTS

| | | | |
|---|---|---|---|
| EP | 2414622 | | 11/2017 |
| EP | 2591201 | | 10/2019 |
| WO | 2018222197 | A1 | 12/2018 |
| WO | 2018222198 | A1 | 12/2018 |
| WO | 2019-125409 | | 6/2019 |

OTHER PUBLICATIONS

Manara system in multilateral wells, Schlumberger. Accessed Feb. 1, 2022. Available at https://www.slb.com/completions/well-completions/intelligent-completions/intelligent-completion-systems/manara-production-and-reservoir-management/multilateral-wells.

Halliburton, FlexRite, Electrical Linear Actuator Concepts, Nov. 24, 2020.

Intelligent Completions, Smartwell intelligent completion systems, Halliburton. Accessed Feb. 1, 2022. Available at https://www.halliburton.com/en/products/smartwell-technology-enhanced-functionality.

Well Completions, Intelligent Completions, DataSphere@ LinX® Monitoring System, Halliburton, H012113, May 2021.

International Search Report and Written Opinion for Application No. PCT/US2021/060858, dated Mar. 17, 2022.

Office Action Summary for U.S. Appl. No. 17/535,390 dated Nov. 15, 2023. PDF file. 12 pages.

United Kingdom Office Action for GB Patent Application No. 2303890.4 dated Apr. 18, 2023. PDF file. 5 pages.

* cited by examiner

TRAVEL JOINT FOR TUBULAR WELL COMPONENTS

CROSS-REFERENCE TO RELATED APPLICATIONS

The present application is a non-provisional of U.S. patent application Ser. No. 63/118,830, the entire disclosure of which is incorporated herein by reference.

BACKGROUND

Intelligent well completion systems are used to remotely control and monitor reservoir zones in a well. Generally intelligent well completion systems include valves, as well as other features, configured to provide flow control within the well. Power and communication signals may be provided to the valves from the surface via wiring extending from the surface and through casing and/or other tubulars of the intelligent well completion system. However, connecting the valves and other features to the surface in a multilateral well requires a more complex system that provides connections to a plurality of downhole valves that may be disposed in the main wellbore as well as in wellbore branches extending out from the main wellbore. Unfortunately, traditional systems for splitting the connection from the main wellbore to the wellbore branches may provide unreliable connections, which may hinder efficiency of well production operations.

BRIEF DESCRIPTION OF THE DRAWINGS

These drawings illustrate certain aspects of some of the embodiments of the present disclosure and should not be used to limit or define the method.

DETAILED DESCRIPTION

Figure 1:
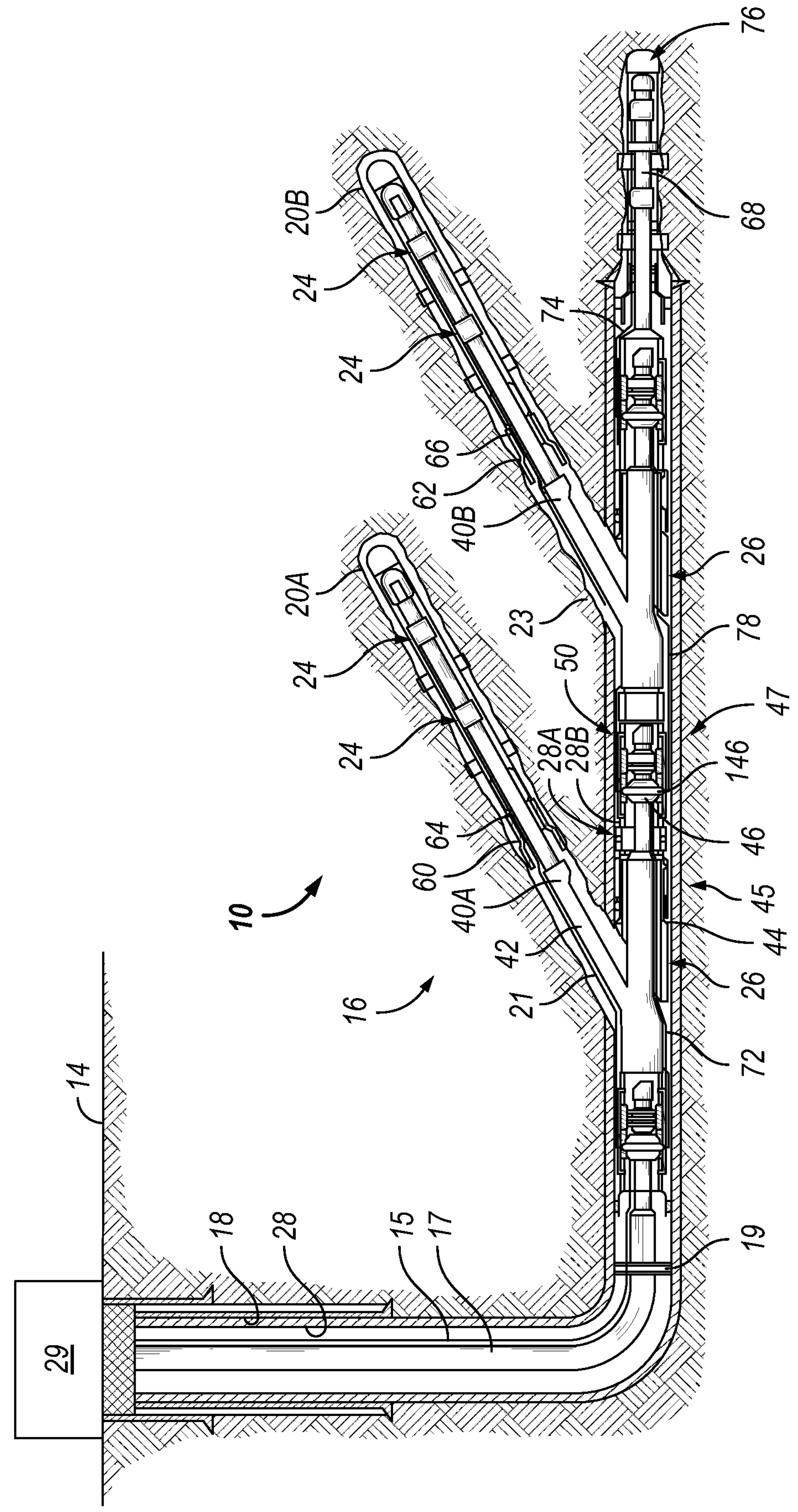
FIG. 1 illustrates a schematic view of a completion system for a multilateral wellbore, in accordance with some embodiments of the present disclosure.

A downhole tool connector, system, and method are disclosed, allowing relative movement between connected downhole tools. More particularly, a travel joint may be included for connecting tubular components. The tubular components may be components of a well tool or components of a large well system, or some combination thereof. In some examples below, the well system is a completion system and the tubular components may be components of the completion system. The completion system as a whole may be analyzed as multiple completion systems, such as a first completion system and a second completion system. The terms first and second are not intended to imply a particular order; however, in some examples, the first completion system is a lower completion system and the second completion system is an upper completion system. The connection may be between tubular components of a completion system. The connection may alternatively be between a tubular component of one completion system with a tubular component of another completion system. In examples below, a first completion system is a lower completion system installed downhole and a second completion system is lowered into connection with the first completion system. Specific examples below include a multilateral deflector assembly as the first tubular component for receiving a tubular leg of a multilateral junction as the second tubular component.

The connector in any given configuration may be referred to as a sliding connector in that it allows axial (e.g., linear) relative movement between connector bodies of the respective downhole tools. Examples of the sliding connector may additionally be configured to provide energy transfer of power and communication signals and fluid communication while allowing this relative movement. The sliding connector accommodates relative movement between connected tools during operational steps and subsequent lifecycle loads. This may reduce or eliminate stresses between male and female connector bodies or inductive couplers that may otherwise result from relative tool movement downhole.

Systems and methods are also disclosed in which the travel joint may be used for installing and operating an intelligent completion system to transfer power and communication in a hydrocarbon recovery well. Example embodiments are discussed below in the context of a multilateral well, by way of example. However, the systems and methods can be used in other wells such vertical wells, horizontal wells, or other wells where a downhole connection with relative movement between connector bodies is desired. The system may also be used in systems with more than two completion systems (e.g., a third, middle string). Aspects may be used with electrical submersible pumps, ("ESP") technologies, etc. ESP is an efficient and reliable artificial-lift method for lifting moderate to high volumes of fluids from wellbores. These volumes range from a low of 150 B/D to as much as 150,000 B/D (24 to 24,600 $m^3$/d). Variable-speed controllers can extend this range significantly, both on the high and low side. The energy carried through the disclosed connectors can be used to provide power to other systems such as a down-hole hydraulic system, and fiber-optical system, sonic, gamma, radio frequency (RF), energy convertor, computer, logic controller, etc.

An example system includes a multilateral junction, optionally using inductive couplers within the travel joint to connect to other downhole tools. The connections made at the multilateral junction may allow for energy transfer power and data transmission from the surface to downhole portions of a multilateral well, including the main wellbore and to wellbore branches. This connection and method may facilitate the downhole coupling and de-coupling of two devices, such as between a junction leg of the disclosed multilateral junction with the bore of a downhole completions assembly that receives the junction leg.

A disclosed system embodiment may allow relative movement between two components, such as a seal assembly in an upper completion and a travel joint in a lower completion. The system embodiment may also include energy transfer connectivity, such as using Energy Transfer Mechanisms (ETMs) or Wireless Energy Transfer Mechanisms (WETMs), to provide continuous energy transfer (e.g., power and/or communication) between two or more downhole tools or components even while there is relative movement between the tools/components. A disclosed method embodiment allows for engaging two or more downhole tools/components mechanically, electrically and/or hydraulically, or other forms of energy. The engagement may happen during the same trip or even if/when the tools/components are run into the well on separate trips. The connected tools may move relative to one another in cases where axial forces or movement might otherwise have to be absorbed by a rigid connection. Allowing relative movement thereby accommodate these forces or movements between tools or components, optionally also maintaining energy transfer (power, data, etc.). The method may also allow the tools to remain hydraulically connected, e.g., to allow hydrocarbons to flow between the tools without losing fluid or encounter a pressure drop.

The connections may be used to provide power, data, controller functionality, logic, computational transmission, etc. to one or more locals within a well to another one or more locals (including the surface). The connections may be used to provide sensed data about the connector itself (e.g., position, oil temperature, forces, pressures, etc.). The connector may incorporate resistance (e.g., springs or other biasing mechanism) to absorb movement in the connector and/or one or more tools or systems caused by displacements of one or more tools. The displacements may be due to loads (e.g. forces during engagement of systems or tools, operation of system(s)) and/or thermal displacements, etc. The connector may incorporate one or more dampeners (e.g. dashpot, vibration dampeners, shock absorbers, etc.) to control shocks and vibrations due to natural events such as gas breaking out of oil violently, turbulence-induced vibrations, fluid hammer, vortex shedding, cavitation-induced vibrations and other fluid-structure interactions potentially caused by equipment installed in the well and the operation of such equipment, human-intervention operations, stimulations, cool-down issues, etc. Other features may be used to monitor the well's parameters, equipment's parameters, natural-occurring variables, and other parameters.

FIG. 1 illustrates an elevation view of a completion system 10 for a multilateral well 16, as an example of a downhole system in which embodiments of the present disclosure may be implemented. The multilateral well 16 is formed below a surface 14 of a well site 12. The surface 14 may represent ground level of a land-based well site or the sea floor of a subsea or offshore well site, for example. Various surface equipment 29 may be located at or above the surface 14 for supporting drilling and completion of the multilateral well 16. The surface equipment may include, for example, a rig for supporting downhole equipment as it is lowered into the well 16, fluid systems for circulating fluid to and from surface 14, and electrical equipment for communicating power and data with downhole equipment. The completion system 10 may comprise a category generally referred to as intelligent completions, wherein electronic controls are implemented to monitor and control production of hydrocarbons. Thus, reliable and robust energy transfer equipment and connections are desired, as provided by aspects of this disclosure.

The multilateral well 16 includes a main bore 18 which may include a vertical portion extending from surface 14 and which transitions to a horizontal portion further below the surface 14. At least a portion of the main bore 18 may be lined with a string of casing 28. Components of the casing 28 may include a liner hanger 28A and liner 28B. In FIG. 1, liner hanger 28A and liner 28B are not installed at the same time as casing 28. In this embodiment, liner hanger 28A and liner 28B are installed after lateral 20B has been drilled, lateral liner/screens 60, 62 have been installed and lower lateral completion system 66 has been installed. In one embodiment, liner hanger 28A and liner 28B are installed with lower Junction 40B. The lower lateral completion system 66 may be installed simultaneously with lower Junction 40B or it may be installed prior to the installation of lower Junction 40B. The multilateral well 16 includes any number of lateral wellbores (i.e., laterals) 20 that intersect the main bore 18, and in this example includes first and second laterals 20A, 20B. Laterals may be formed in any suitable manner, such as using some version of a whipstock assembly or its equivalent. A production packer 19 seals the well 16 above where the completion system 10 or lower components thereof are installed. The production packer 19 may seal an annulus between a tubular string 17 which may include upper components (not shown) of the completion system 10. An upper umbilical 15 extends along the tubular string 17 to surface, providing an energy transfer conduit for power and data between the surface 14 and lower components of the completion system 10.

The lower components of the completion system 10 may include any number of multilateral junctions for reinforcing the well 16 at the intersections with the main bore 18 and laterals 20. In the illustrated embodiment, the completion system includes an upper multilateral junction 40A at an intersection between the main bore 18 and the upper lateral 20A and a lower multilateral junction 40B at an intersection between the main bore 18 and the lower lateral 20B. The upper multilateral junction 40A includes a first leg (i.e., lateral leg) 42 disposed in the upper lateral 20A and a second leg (i.e., main bore leg) 44 disposed in the main wellbore 18. Similarly, the lower multilateral junction 40B includes a lateral leg 42 disposed in the lower lateral 20B and a main bore leg 44 disposed in the main wellbore 18. The two multilateral junctions 40A, 40B may be discussed generally to refer to similar features, but the multilateral junctions are not required to be identical.

The completion system 10 of FIG. 1 is an example of a well system in which there are multiple well tools to be connected to establish energy transfer and fluid communication between different parts of the completion system 10. For example, the multilateral well 16 may require such a connection to be made where a well tool is tripped downhole to land in one of the legs 42, 44 of one of the multilateral junctions 40 or elsewhere in completion system 10. Such connections may also be required between each leg 42, 44 of a multilateral junction with the respective lateral or main bore portion downhole of the legs 42, 44. Each connection may be required to provide both fluid communication and energy transfer across the connection between any two points in the multilateral well 16 on either side of the connection. A travel joint 50, as further described below, may be configured for use at any of these connections to provide fluid communication across the connection. In some embodiment, the travel joint 50 may additionally provide energy transfer communication across the connection.

As illustrated, a plurality of control modules and/or sensor devices 24 may be disposed within each lateral 20A, 20B as part of the completion system 10, the upper lateral liner/screen 60, and/or lower lateral liner/screen 62, and/or the upper lateral completion system 64, and/or lower lateral completion system 66, and/or the lower mainbore completion system 68, and/or the lower mainbore liner/screen system 76. The control modules and sensor devices 24 may include or be operatively connected with controllable production valves, for example, to selectively control production flow from different laterals or from different portions of each lateral 20. The upper multilateral junction 40A may provide energy transfer pathways to couple wiring (e.g., the upper umbilical 15) to corresponding wiring of the lateral leg 42 (e.g., upper lateral umbilical 21) to provide energy transfer of power and/or communication signals to/from the plurality of control modules and/or sensor devices 24 in the upper lateral 20A. Likewise, the lower multilateral junction 40B may provide energy transfer pathways to/from couple wiring (e.g., the upper umbilical 15, upper mainbore umbilical 72, mid-mainbore umbilical 78, and/or lower mainbore umbilical 74) to corresponding wiring of the lateral leg 42 (e.g., lower lateral umbilical 23) to provide energy transfer for power and/or communication signals to/from the plurality of control modules and/or sensor devices 24 in the lower lateral 20B and other locals. In at least some embodiments, the power and communication signals may be sent from the surface 14 via the wiring to control operation of one or more downhole tools, such as downhole valves. Communication signals may also be sent to/from sensors or other devices, via the wiring, from/to the surface 14 or other locals. As such, the wiring connection may allow the surface to remotely control devices and monitor reservoir zones via one or more well tool connections at the multilateral junctions 40.

The completion system 10 also includes a multilateral completion deflector 26 at each multilateral junction 40. In the illustrated embodiment, the deflector 26 at the upper junction 40A may be referred to as an upper completion deflector and the deflector 26 at the lower junction 40B may be referred to as a lower completion deflector. Each multilateral completion deflector 26 may be disposed directly downhole from a corresponding lateral 20 to deflect tools of the completion system out into the corresponding lateral 20. For example, each deflector 26 may be configured to deflect a lateral leg 42 of the respective multilateral junction 40. In at least some embodiments, each deflector 26 may provide a no-go location for the respective multilateral junction 40. The deflector 26 may have a large enough inner diameter (ID) for receiving a main bore leg 44 of the multilateral junction 40, so as to guide the main bore leg 44 of the multilateral junction 40 into its bore. The multilateral completion deflector 26 may include features that reduce or eliminate bending stresses on the multilateral junction components. A multilateral deflector bore may be configured to restrict the flow area when the main bore leg 44 of the multilateral junction 40 enters with the intent to create a pressure increase that can be seen from surface.

When the multilateral junction 40 is landed or latched into the multilateral completion deflector 26 or an assembly that includes the multilateral completion deflector 26, a hydraulic seal is formed in which the geological formation around the one or more casing junctions is hydraulically isolated from the internal bore of the multilateral junction 40 and/or other casing junction(s). An alternative way to deflect the end of the pipe and/or string 17 connected to the multilateral junction lateral leg 42 into the lateral wellbore is to use a bent, articulating, sensor or weighted joint connected on the end of the pipe and/or string 17 on end of the lateral leg 42 of the multilateral junction 40.

Any two downhole components where one is connected to the other according to this disclosure may be considered downhole tools so connected. In the context of FIG. 1, just by way of example, when the main bore leg 44 of the respective multilateral junction 40 is lowered into the main bore 18 and lands in the multilateral completion deflector 26, the main bore leg 44, extends through the completion deflector 26 to connect with another component 47 (e.g., a lower completion assembly) having a seal bore, a polished bore receptacle, a corresponding ETM 146, a WETM, an female inductive coupler, a female portion of a wet-mate connector, a travel joint, a slidable sleeve, a slip joint and/or other components used in the production of oil and gas, etc.), attached below the liner hanger. In an alternative configuration of FIG. 1, the connection 45 could alternatively be formed between the main bore leg 44 (as one well tool) and the completion deflector 26 (as another well tool), but such other configuration may require another energy transfer device between the completion deflector and the lower completion. The connection 45 may comprise one or more of an electrical, mechanical, fluid, and/or another energy connection. The energy transfer connection permits the transmission of power and/or signals across the connection. One fluid connection permits the flow of fluids across the connection, such as produced hydrocarbons (subject to valves and other flow controls). The mechanical connection may be a releasable connection that physically holds the devices together, to thereby maintain the energy transfer and fluid connection, until the connection 45 is released. In some embodiments, the mechanical connection allows relative movement between the main bore leg 44 and the well tool to which it is connected (e.g., the deflector 26 or other equipment below the liner hanger) while maintaining the energy transfer and fluid connections, as further described below and shown in subsequent figures.

The energy transfer connection may be made in a number of ways, either through direct or indirect contact or contactless (e.g., inductive) electrical communication between corresponding connector bodies. In some cases, the connection comprises an energy transfer mechanism (ETM) 46 on the multilateral junction with a corresponding ETM 146 on or connected to an coupling device of the multilateral completion deflector 26 or other equipment below the liner hanger. Each ETM 46 can transfer power and/or data communication to other ancillary devices to which it is connected in an adjoining lateral wellbore and/or main wellbore, such as via an electrical conduit or wirelessly, and said ancillary devices can transfer communication and/or power back to the respective ETM 46. The ETMs 46 may communicate with each other across the connection 45. Thus, power and communication may be transferred from surface 14 to the uppermost ETM in the well and said ETM can transfer communication back to surface 14. Likewise, power and communication may be transferred from one ETM in the well to one or more ETMs.

In some configurations, the ETM may rely on physical (director or indirect) energy transfer contact between components of the mating connector bodies, including corresponding first and second energy transfer contacts that are positioned for contact when one connector body is releasably secured to the other connector body. In other configurations, an ETM may be a wireless energy transfer mechanism (WETM) such as an inductive coupler for electrically coupling the first and second connector bodies without direct electrical contact with each other when the connector bodies are releasably secured.

The system may include use of one or more system test tools for monitoring ETMs, WETMs, inductive couplers, systems, methods, etc. The system may include one or more of linear slip rings to assist with aligning the multilateral junction 40 to the multilateral completion deflector 26 or other equipment below the completion deflector and/or below the liner hanger. The device or method to transfer power or communications to a lower lateral wellbore may or may not be reliant on the device or method to transfer power or communications to an upper lateral wellbore. The method of which the anchoring devices for the multilateral junction 40 are conveyed, allows for frequent and intermittent axial orientation checks via a pressure pulse device such as measurement while drilling (MWD) tool, a work string orientation tool (WOT), etc. Moreover, the system may include use of an isolation device between the lateral wellbores 20 that can be opened and closed repeatedly.

Any of a variety of well tools may be connected according to aspects of the disclosure. As shown in FIG. 1, a first downhole tool 200 may include the deflector assembly 26 installed downhole. As illustrated, the first downhole tool may further include the lower completion assembly, which may comprise a seal bore, a polished bore receptacle, an ETM, a WETM, a female inductive coupler, a female portion of a wet-mate connector, a travel joint, a slidable sleeve, a slip joint and/or other components used in the production of oil and gas, etc.) A second downhole tool (e.g., a mainbore leg 44 of a multilateral junction 40) may be lowered into connection with the first downhole tool 200. The second downhole tool may have other devices attached to it including, but not limited to, a seal assembly, a locking device, an ETM 46, a male WETM, a male inductive coupler, a male portion of a downhole wet-mate connector, a sensor, an energy storage device, a spring, a seal protector device, a collet, a no-go shoulder, a travel joint, a slidable sleeve, a slip joint and/or other components used in the production of oil and gas, etc. In some embodiements, these devices may be positioned on the distal end of a mainbore leg 44. In some embodiements, these devices may be positioned below and/or above the ETM 46, as shown in FIG. 1. The first downhole tool 200 includes a through bore 202 for receiving the second downhole tool 300 to make the connection.

Moreover, the terms "first" and "second" are used to refer individually to the respective tools 200, 300, and the terms are not intended to be limiting such as in terms of a particular order or arrangement. In many embodiments, the first downhole tool 200 is not the first tool to be installed downhole. In some embodiments, second downhole tool 300 may be installed after several other tools have been installed. In other embodiments, a first downhole tool 200 may be installed after one or more second downhole tool 300.

Examples are discussed below in the context of a first completion section and a second completion section deployable after installation of the first completion section in the well 16. Some examples discussed below, more specifically, include another completion system which may comprise an anchor, an anchor packer, a seal bore, an ETM 46, a female WETM, a female inductive coupler, a sensor, an energy storage device, a spring, a seal protector device, a collet, a travel joint, a slidable sleeve, and/or other components used in the production of oil and gas, etc. installed downhole the deflector assembly 26 and a multilateral junction 40 lowered into connection with the another completion system or component such as an anchor, an anchor packer, a seal bore, an ETM 46, or a female WETM. As the multilateral junction is lowered into connection with the lower completion assembly, which may comprise an anchor, an anchor packer, a seal bore, an ETM 46, a female WETM, and/or other components used in the production of oil and gas, etc., a main bore leg of the multilateral junction 40 extends through the deflector assembly 26, via the through bore 202 of the deflector assembly 26, to couple with the lower completion assembly. However, it should be recognized that these are merely examples and that the principles may apply to any two tubular well components to be connected downhole that utilize the disclosed aspects.

In the illustrated embodiment, the first downhole tool 200 is the deflector assembly 26 having through bore 202 (e.g., a central bore) with an entry guide 204 to accept specific size downhole tools (e.g., the main bore leg 44 of the junction, R&R tool, etc.) and deflect other (e.g., larger) downhole tools and/or profiles. For example, the entry guide 204 may be sized and shaped to deflect a bullnose of a lateral leg 42 of the junction 40.

The deflector assembly 26 may also include a first anchoring device 208 (e.g., a packer assembly) for anchoring the deflector assembly 26 in the wellbore. The first anchoring device 208 may be a fixed device. However, in some embodiments, the first anchoring device 208 is a releasable device. Further, the first anchoring device 208 may be a re-settable device such that the first anchoring device 208 may be disengaged and re-engaged in the wellbore 18.

The deflector assembly 26 may also include internal seals 210 for sealing of tools (e.g., the main bore leg 44 of the junction 40 and R&R tool). The internal seals 210 may be protected while being run-in-hole with a protective sleeve (not shown). The internal seals 210 may include a releasable fixed protective sleeve designed to stay in place until the multilateral junction 40 is landed. The internal seals 210 may have a pressure rating of greater than 4,000-psi and while maintaining the ability to pass large downhole tools through the through bore 202. The internal seals 210 may have a pressure rating of greater than 5,000-psi and while maintaining the ability to pass large downhole tools through the through bore 202. The internal seals 210 may have a pressure rating of greater than 7,500-psi and while maintaining the ability to pass large downhole tools through the through bore 202. The deflector assembly 26 may also include profiles or features to engage sleeves, store sleeves, engage keys, and/or lock with sleeves. The deflector assembly 26 may also include indicators for indicating position, pressure, health, condition, of whipstock and/or related downhole assemblies and components, as well as assemblies below (e.g., lower inductive couplers, lower completion system, etc.). The indicators may indicate a position of the junction, a pressure differential across one or more sealing members, and sensors (e.g., Hall effect, inductive, contact, non-contact, temperature, pressure, movement, and/or position).

The deflector assembly 26 may be configured to transfer power from one portion of the deflector assembly 26 to another deflector or downhole tool. The deflector assembly 26 may include a cable, control line 212, etc. configured to transfer energy from below or near a bottom of the deflector assembly 26 to one or more legs 42, 44 of the junction 40, the first anchoring device 208, components associated with the deflector assembly 26, the ETM 46, a wireless energy transfer mechanism (WETM), inductive coupler, one or more switch, a regulator, computer, energy storage device, and/or controller. In some embodiments, the ETM 46, WETM, and inductive coupler are protected while run-in-hole by a protective sleeve. The deflector assembly 26 may transfer power to above, near, and/or below the anchor. In some embodiments, the deflector assembly 26 may include the cable, control line 212, etc. configured to transfer energy from above, near, and/or below the top of the deflector assembly 26 to one or more EMT 46, WETM, inductive couplers, switches, regulators, computers, energy storage devices, and/or controllers. The deflector assembly 26 may be configured to transfer power via one-way, two-way, three-way, half-duplex, full-duplex, asynchronous, synchronous, analog, digital, phase-modulated, frequency modulated, AC, DC, pulsed, and/or other energy transfer methods, devices, technologies.

In some embodiments, the deflector assembly 26 is configured to transfer power from a first portion of the deflector assembly to a second portion of the deflector assembly via the control lines 212 (e.g., transmission lines). The transmission lines may transmit electrical, hydraulic, electromagnetic, magnetic, mechanical, acoustic, light energy, and/or other type of energy or combinations thereof. The transmission line may be one-way, bi-directional, common ground, separate grounds. Further, the transmission lines may include energy converters, transformers, and/or storage devices. The transmission lines may connect one or more energy converters, transformers, and/or data and/or energy storage devices.

The transmission lines may be located exterior the deflector assembly, exterior parts of the deflector assembly or interior the deflector assembly or mid-wall of the deflector assembly. For example, the transmission lines may be located interior of parts of the deflector assembly, internal (mid-wall) the deflector assembly, internal (mid-wall) parts of the deflector assembly, internal between two or more components of the deflector assembly. Further, the transmission lines may be exterior, interior, or internal to parts of the deflector assembly or parts associated with and/or connected to the deflector assembly. The transmission lines maybe one or more, or a combination of wire, cable, tubular, mesh, and other devices, combination of devices, methodologies know to those skilled in one or more arts, and yet-to-be invented or discovered or used singularly or in one or more combinations thereof. The transmission lines may be configured to transition from exterior, interior, or internal the deflector assembly to internal, interior, or exterior the deflector assembly or any combination thereof.

In some embodiments, the deflector assembly, and corresponding second downhole tool (e.g., the main bore leg 44 of the junction 40), include the ETM, WETM, or inductive coupler to transfer power and/or communication to above, below, or inside the deflector assembly. The ETM, WETM, or inductive coupler mounted above the deflector assembly may be configured to transfer power and/or communication to one or more wellbores, legs, devices in the wellbores, distal ends, devices above the anchor devices, or to one or more devices in, above, below, outside, above, and/or below the deflector assembly or combination thereof. The ETM, WETM, or inductive coupler mounted below the deflector assembly may be configured to transfer power and/or communication to one or more wellbores, legs, devices in the wellbores, distal ends, devices above the anchor devices, or to one or more devices in, above, below, outside, above, and/or below the deflector assembly.

The transmission lines (e.g., electrical conduit, fiber optic conduit, hydraulic conduit, etc.) for the deflector assembly may include cables (e.g., group or bundle of multiple wires inside a common sheathing), submersible cable, wires (e.g., single conductor or multi-conductor), mesh, and/or other transfer or distribution devices. In some embodiments, the transmission lines include hydraulic lines. The hydraulic lines may be a single conductor line (pipe, tube, etc.) or multi-conductor line (pipe, tube, etc.). In some embodiments, the hydraulic lines include a submersible cable configured for operation in wet or submersed locations. The submersible cable may be very rugged, abrasion-resilient and extremely durable and reliable to meet the challenges present in the installation and operational environments. Further, the submersible cable may have a single as well as multiple conductor design having flat or round structure to meet its applications. The submersible cable may also include conductors with earth connections as well as the control wires that runs along the power conductors. Moreover, the transmission lines may include fiber optic cable or other energy-transfer technology, energy storage device, data storage device, computer, logic controller or combination of any or all.

Moreover, as set forth above, the first downhole tool 200 (e.g., the deflector assembly 26, the lower completion assembly, or any completion-related tool/assembly such as another completion system which may comprise a packer, a seal bore, an ETM 46, a female WETM, a slack joint, a no-go, sensor, control valve, one or more control lines and/or other components used in the production of oil and gas, etc.) may include the travel joint 50 to provide relative movement between connected downhole tools while maintaining a mechanical, electrical, or other form of energy and/or fluid connection therebetween. The travel joint 50, in its various aspects, provides a sliding mechanical connection between the first downhole tool 200 (e.g., the lower tubular well component) and the second downhole tool 300 (e.g., the upper tubular well component) and to allow relative movement (at least relative axial movement) between the connected first and second downhole tools 200, 300 while they remain connected. Certain features are also disclosed for optionally also maintaining energy transfer and/or fluid communication between the connected downhole tools 200, 300 while allowing the relative movement therebetween. In some embodiments, the travel joint 50 is disposed in a through bore 202 (e.g., the central bore) of the first downhole tool 200 (e.g., a first tubular component). The travel joint 50 includes an axially moveable inner sleeve 214 and an anchoring feature 216 for anchoring the second downhole tool 300 (e.g., a second tubular component) to the inner sleeve 214.

Examples of the travel joint 50 disclosed below continue with the example of a deflector assembly 26 and a multilateral junction 40 lowered into connection with the deflector assembly 26. Again, it should be recognized that the disclosed travel joints 50 may be incorporated into connections between any of a variety of tubular well components not exclusively limited to the combination of deflector assemblies 26 and multilateral junctions 40.

Figure 2:
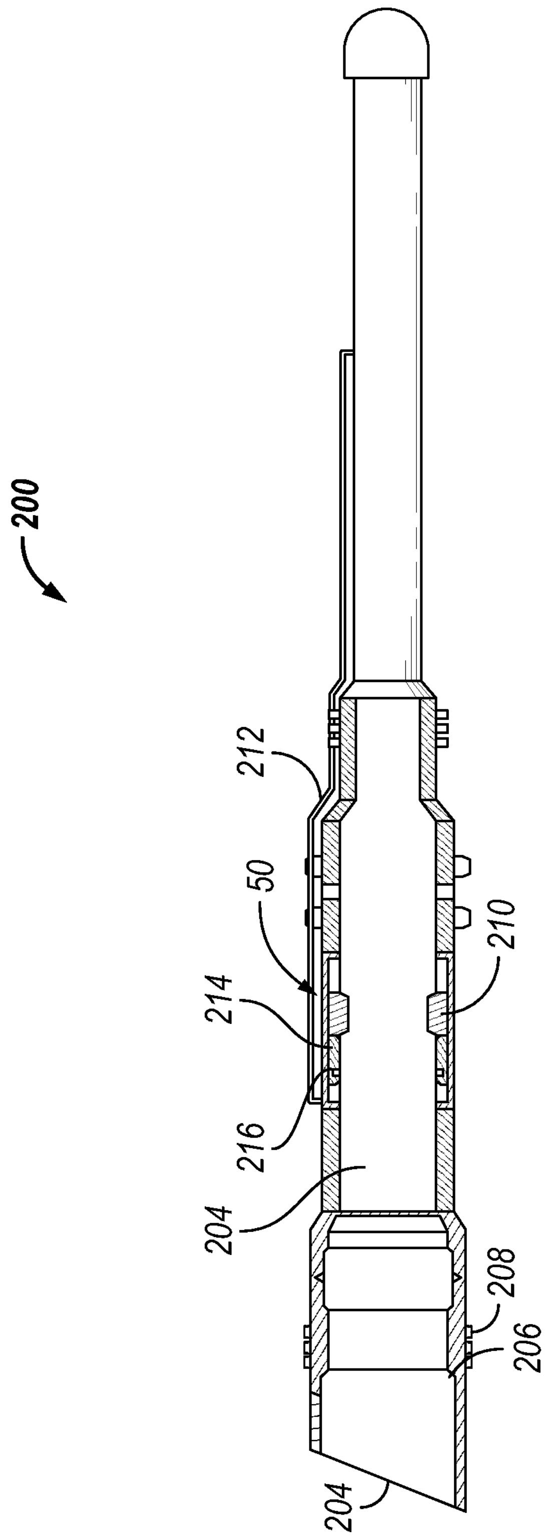
FIG. 2 illustrates a schematic view of a first downhole tool (e.g., a lower completion assembly or deflector assembly) having a travel joint, in accordance with one or more embodiments.

FIG. 2 is a sectional view further detailing the deflector assembly 26 according to an example configuration. The deflector assembly 26 is an example of a tubular component that has a travel joint 50 in accordance with one or more embodiments. The first downhole tool 200 may be included with a first completion system, and the deflector assembly 26 comprises a first tubular component of the first completion system. The travel joint 50 provides relative movement between connected downhole tools while maintaining a mechanical connection therebetween. In some embodiments, the travel joint 50 may further maintain energy transfer and/or fluid communication therebetween. In this example, the travel joint 50 allows a second tool or tubular component thereof to be at least mechanically connected to the deflector assembly 26 allowing relative movement between the connected first and second tubular components. Energy transfer, including transfer of electricity, and fluid connectivity may also be provided at this connection as further described below.

Figure 3:
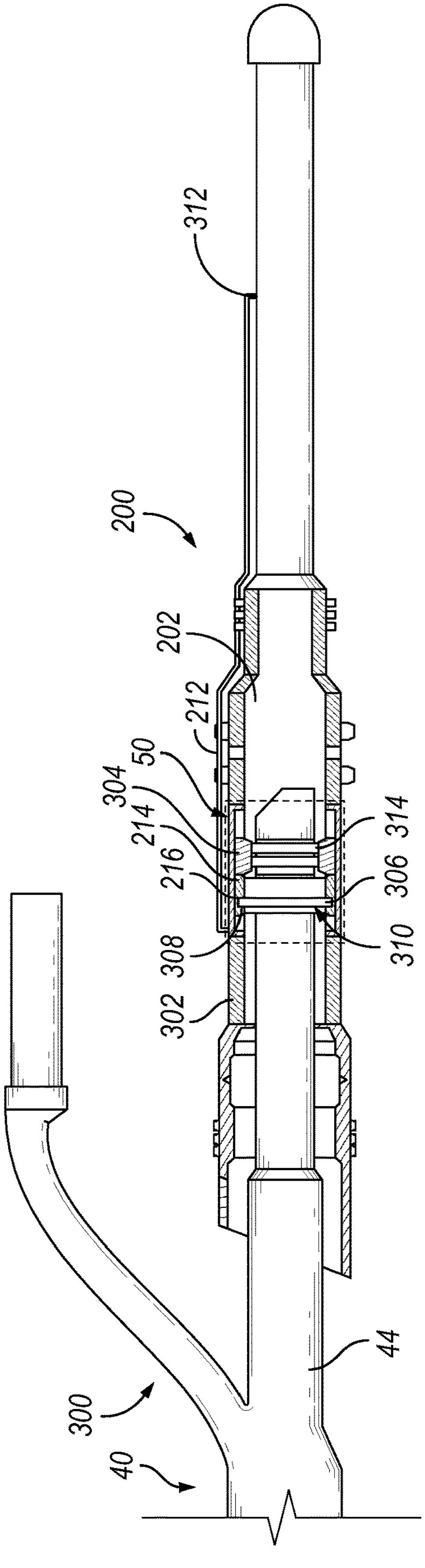
FIG. 3 illustrates a schematic view of the first downhole tool coupled with a second downhole tool (e.g., a mainbore leg of a multilateral junction) via the travel joint. (e.g., a multilateral junction having a mainbore leg and a lateral bore leg), in accordance with one or more embodiments.

FIG. 3 illustrates a sectional view of the first downhole tool 200 (e.g., the deflector assembly 26) coupled with a second downhole tool 300 via the travel joint 50, in accordance with one or more embodiments. The first downhole tool 200 may be included with a first (e.g., lower) completion system. The second downhole tool 300 may be included with a second (e.g., upper) completion system. The first downhole tool 200 (e.g., the deflector assembly 26) has an outer sleeve 302 and a through bore 202 (e.g., the central bore), defined by the outer sleeve 302. As illustrated, the through bore 202 may receive the second downhole tool 300 (e.g., a mainbore leg 44 of a multilateral junction 40). Further, the first downhole tool 200 may include the travel joint 50 disposed within the through bore 202. The travel joint 50 has the inner sleeve 214 that slides axially with respect to an outer sleeve 302 of the first downhole tool 200, as well as the anchoring feature 216 attached to the inner sleeve 214. In the illustrated embodiment, the travel joint 50 further includes a travel housing 304 defined in the outer sleeve 302 to restrain axial movement of the inner sleeve 214 between a first axial position (shown in FIG. 5) and a second axial position (shown in FIG. 6). However, the inner sleeve 214 may additionally or alternatively be restrained via shoulders, stop blocks, pins, or other suitable features, defined in the outer sleeve 302 and/or inner sleeve 214. It should be noted that the inner sleeve 214 of travel joint 50 slides axially with the outer sleeve 302 instead of telescoping inward and outward (e.g., to adjust a length of the travel joint). In the illustrated embodiment, the inner sleeve 214 slides axially with respect to the outer sleeve 302. Hence the only mass required to move is the string 300 and inner sleeve 214 which may reduce the momentum of the system. Less momentum reduces seal wear and impact loading on the outer sleeve 302.

The second downhole tool 300 couples to the first downhole tool 200 via the travel joint 50. After the second downhole tool 300 is received in the through bore 202 of the first downhole tool 200, the second downhole tool 300 may continue to travel through the through bore 202 toward the anchoring feature 216 of the travel joint 50. The anchoring feature 216 is configured to engage the first downhole tool 200 to secure the second downhole tool 300 to the travel joint 50. Indeed, the anchoring feature 216 may rigidly connect the second downhole tool 300 to the inner sleeve 214 of the travel joint 50. Moreover, as the inner sleeve 214 may move axially between the first position 516 and the second position 600 with respect to an outer sleeve 302 of the first downhole tool 200, the travel joint 50 may provide relative movement between connected downhole tools while maintaining a mechanical, electrical, and/or fluid connection therebetween. Providing relative movement between the between first downhole tool 200 to the second downhole tool 300 may reduce strain on the first downhole tool 200 to the second downhole tool 300 during production operations.

In some embodiments, the second downhole tool 300 may also include a corresponding anchoring feature 216 (e.g., a second anchoring feature 306). The second anchoring feature 306 of the second downhole tool 300 may interface with a first anchoring feature 216 of the travel joint 50 to mechanically couple the second downhole tool 300 to the travel joint 50 of the first downhole tool 200. In some embodiments, the first anchoring feature 216 may include a mating inner diameter profile corresponding to second anchoring feature 306 (e.g., collet, keys, radial dogs, ratch-latch, versa-latch, etc.) on the mainbore leg 44 of the multilateral junction 40. The corresponding anchoring features 216, 306 are configured to retain a mechanical coupling between travel joint 50 of the first downhole tool 200 and the second downhole tool 300 throughout production operations.

The travel joint 50 may further include a first energy transfer coupler 308. For example, the inner sleeve 214 may include features such as an ETM, WETM, and/or inductive coupler. Moreover, the second downhole tool 300 may include a corresponding second energy transfer coupler 310 (e.g., ETM, WETM, and/or inductive coupler). Connecting the first energy transfer coupler 308 to the second energy transfer coupler 310, via anchoring the second downhole component to the travel joint 50, is configured to establish energy transfer (e.g. power and/or communication) between the first and second tubular components. Further, one or both of the first and second energy transfer coupler 310*s* may include contactless couplers.

Further, the travel joint 50 may maintain relative position between the first and second energy transfer couplers 308, 310 while allowing relative movement between the first and second downhole tools 200, 300 such that energy transfer (e.g., power and/or communication) between the first and second downhole tools may be maintained despite movement between the first and second tubular components. Indeed, the travel joint 50 is configured to ensure the first and second energy transfer couplers 308, 310 move together as a unit and maintain their alignment during operation and subsequent lifecycle loading. As set forth above, the inner sleeve 214 of the travel joint 50 may move with axially with respect to the outer sleeve 302 once activated. Additionally, the inner sleeve 214 may be free to rotate with respect to the outer sleeve 302. The travel joint 50 accommodates for any movement of the first downhole tool 200 (e.g., the outer sleeve 302) with respect to the second downhole tool 300 during operational steps (e.g., pressure tests) and subsequent lifecycle loads (e.g., heating/cooling and pressure drawdown) without moving the position of the male and female inductive couplers with respect to each other. Moreover, the travel joint 50 eliminates stresses on the first and second energy transfer couplers 308, 310 due to any movement caused factors mentioned above.

In the illustrated embodiment, the first downhole tool 200 includes a control line 212 connected to the travel joint 50. In some embodiments, the control line 212 is connected to the first energy transfer coupler 308. In particular, the control line 212 may be connected to an exterior of the first energy transfer coupler 308 disposed at the top end of the inner sleeve 214. The control line 212 may include a coiled section to allow axial travel of the inner sleeve 214 of the travel joint 50 without damaging the control line 212 due to tension/slack. Moreover, the energy transfer control line 212 provides energy signal and/or power communication to a first completion section having the first downhole tool 200, a second completion section having the second downhole tool 300, a flow control assembly, controllers, sensors, valves, data and/or energy storage devices, or combinations thereof. For example, in the illustrated embodiment, the control line 212 is connected to at least valves 312 disposed downhole from the travel joint 50.

Moreover, as illustrated, the travel joint 50 may include at least one sealing element 314 (e.g., crimp seal, quad seal, vee packing, etc.) for establishing sealed fluid communication between the first downhole tool 200 and the second downhole tool 300. Specifically, the at least one sealing element 314 may establish sealed fluid communication between the through bore 202 of the first downhole tool 200 and a central bore of the second downhole tool 300 when the second downhole tool 300 is anchored to the inner sleeve 214 of the travel joint 50. Further, the at least one sealing element 314 is configured to the sealed fluid communication throughout a full range of travel of the inner sleeve 214 (i.e., movement between the first position 516 to the second position 600.) In some embodiments, the at least one sealing element 314 is disposed on an inner surface of the travel housing 214 to seal against the second downhole tool 300. Further, in some embodiments, the at least one sealing element 314 includes an additional seal disposed between the outer surface 528 of the inner sleeve 214 and an inner surface of the first downhole tool 200 (e.g., the outer sleeve 302) to isolate production through the through bore 202 from the annulus.

Figure 4:
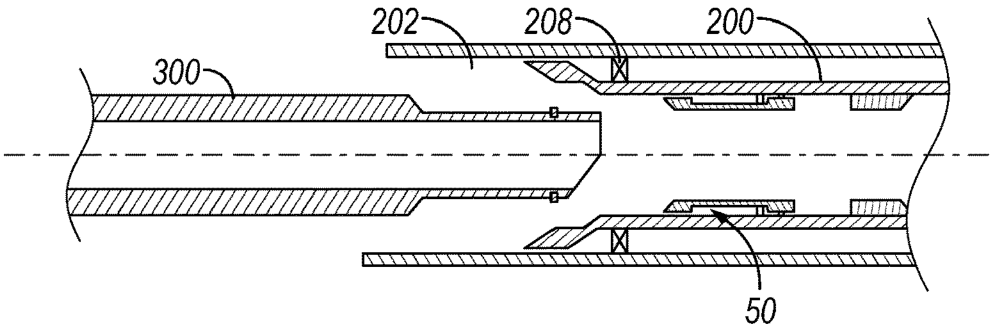
FIG. 4 illustrates a cross-sectional view of the second downhole tool being run-in-hole toward the first downhole tool, in accordance with one or more embodiments.

FIG. 4 illustrates a cross-sectional view of the second downhole tool 300 (e.g., upper completion tool) being run-in-hole toward the first downhole tool 200 (e.g., lower completion tool), in accordance with one or more embodiments. The first downhole tool 200 may be anchored in the wellbore via the first anchoring device 208 (e.g., a packer assembly). Further, as set forth above, the first downhole tool 200 includes the through bore 202 for receiving the second downhole tool 300. In the illustrated embodiment, the second downhole tool 300 is disposed uphole the first downhole tool 200. The second downhole tool 300 may continue to be run-in-hole (e.g., lowered) until the second downhole tool 300 interfaces with the travel joint 50 of the first downhole tool 200 to couple the second downhole tool 300 to the first downhole tool 200.

Figure 5:
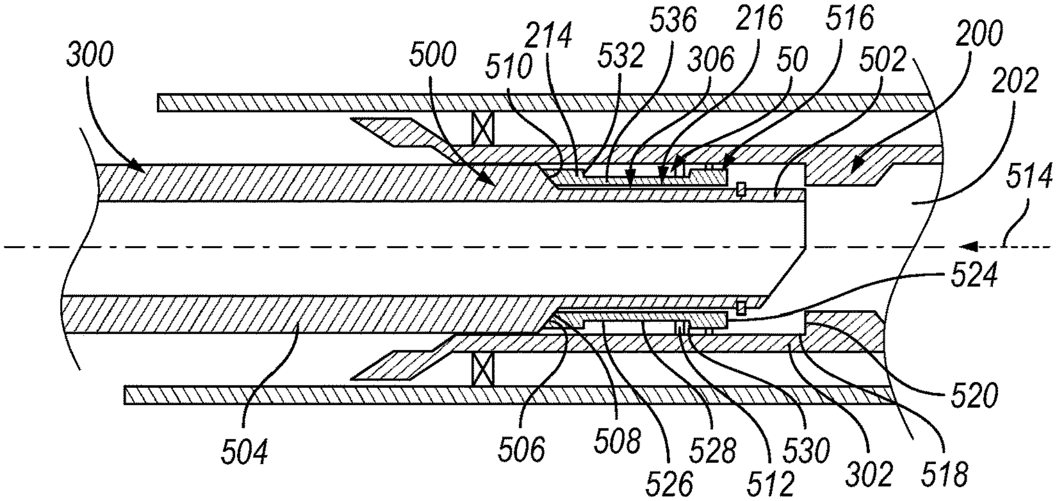
FIG. 5 illustrates a cross-sectional view of the first downhole tool coupled with the second downhole tool in a first position, in accordance with one or more embodiments.

FIG. 5 illustrates a cross-sectional view of another example configuration of the first downhole tool 200 coupled with another example configuration of the second downhole tool 300, in a first position 516. As illustrated, the through bore 202 of the first downhole tool 200 (e.g., lower completion tool) receives the second downhole tool 300 (e.g., upper completion tool). The second downhole tool 300 may include a stepped mating end 500, having a first mating portion 502 and a second mating portion 504, for insertion into the through bore 202. The first mating portion 502 may have a smaller outer diameter than the second mating portion 504 such that the stepped mating end 500 includes a second tool shoulder 506 at a transition from the first mating portion 502 to the second mating portion 504. The second tool shoulder 506 may be straight, angled, curved, etc. The second tool shoulder 506 may be configured to interface with a first axial end 508 of the inner sleeve 214 of the travel joint 50 when the second downhole tool 300 is coupled to the inner sleeve 214 of the first downhole tool 200. Such interface may form a seal. In some embodiments, the second tool shoulder 506 and/or the first axial end 508 of the inner sleeve 214 may include an additional seal feature 710 510 for sealing the second tool shoulder 506 against the first axial end 508 of the inner sleeve 214. Moreover, the outer diameter of the second mating portion 504 may be substantially similar to the inner diameter of the outer sleeve 302 of the first downhole tool 200, and the outer diameter of the first mating portion 502 may be substantially similar to the inner diameter of the inner sleeve 214 of the travel joint 50 such that the second tool shoulder 506 is at least partially radially aligned with the first axial end 508 of the inner sleeve 214.

As set forth above, the travel joint 50 of the first downhole tool 200 is disposed within the through bore 202. The travel joint 50 has the inner sleeve 214 that slides axially with respect to an outer sleeve 302 of the first downhole tool 200. In the illustrated embodiment, the travel joint 50 further includes an axial stop 512 to restrain axial movement of the inner sleeve 214 in a first direction 514 (e.g., uphole direction) at the first position 516 of the inner sleeve 214. In the illustrated embodiment, the axial stop 512 is secured to an inner surface 518 of the outer sleeve 302 and extends into the through bore 202 defined by the outer sleeve 302. However, in some embodiments, the axial stop 512 may be formed, or secured, in the outer sleeve 302. Further, the inner sleeve 214 may include a travel slot 526 formed in an outer surface 528 of the inner sleeve 214. A first travel slot end 530 may contact the axial stop 512 at the first position 516 to restrain axial movement of the inner sleeve 214 in the first direction 514.

Figure 6:
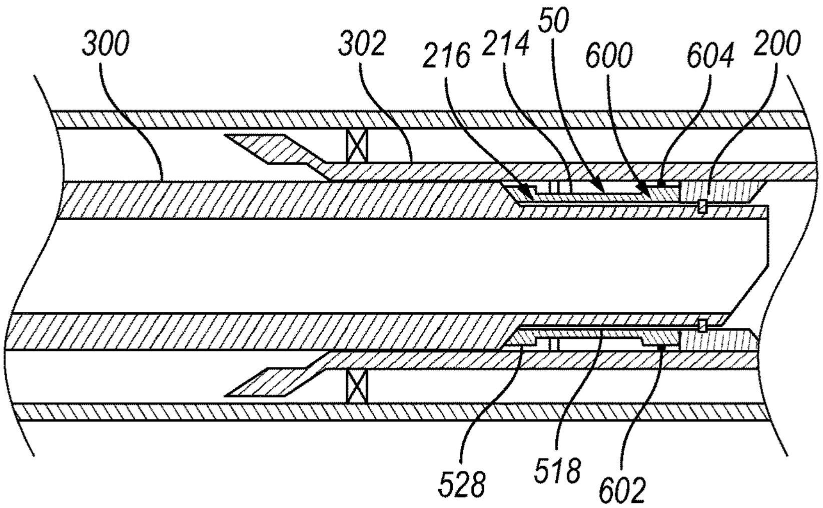
FIG. 6 illustrates a cross-sectional view of the first downhole tool coupled with the second downhole tool in a second position, in accordance with one or more embodiments.

Further, in the illustrated embodiment, an outer sleeve shoulder 520 is formed in the outer sleeve 302 to restrain axial movement of the inner sleeve 214 in a second direction 522 (e.g., downhole direction) at a second position 600 (shown in FIG. 6). A second axial end 524 of the inner sleeve 214 may contact the outer sleeve shoulder 520 in the second position 600 to restrain axial movement of the inner sleeve 214 in the second direction 522. As such, the axial stop 512 and the outer sleeve shoulder 520 may restrain movement of the inner sleeve 214 between the first position 516 and the second position 600. However, the inner sleeve 214 may additionally or alternatively be restrained via shoulders, stop blocks, pins, or other suitable features, defined in the outer sleeve 302 and/or inner sleeve 214. For example, a second travel slot end 532 may contact the axial stop 512 at the second position 600 to restrain axial movement of the inner sleeve 214 in the second direction 522.

Moreover, as illustrated, the second downhole tool 300 couples to the first downhole tool 200 via the travel joint 50 to provide relative movement between the first downhole tool 200 and the second downhole tool 300. After the second downhole tool 300 is received in the through bore 202 of the first downhole tool 200, the second downhole tool 300 may continue to travel through the through bore 202 toward the anchoring feature 216 of the travel joint 50. The anchoring feature 216 is configured to engage the first downhole tool 200 to secure (e.g., rigidly secure) the second downhole tool 300 to the inner sleeve 214 of the travel joint 50. Moreover, as the inner sleeve 214 may move axially between the first position 516 and the second position 600 with respect to an outer sleeve 302 of the first downhole tool 200, the travel joint 50 may provide relative movement between the first downhole tool 200 and the second downhole tool 300 while maintaining a mechanical connection therebetween. Providing relative movement between the between first downhole tool 200 to the second downhole tool 300 may reduce strain and reduce vibrations in the first downhole tool 200 and the second downhole tool 300 during production operations. In some embodiments, an energy transfer and/or a fluid connection may additionally be maintained therebetween.

The anchoring feature 216 may include any suitable feature for rigidly securing the second downhole tool 300 to the inner sleeve 214. The anchoring feature 216 may be disposed on the inner sleeve 214 and/or the second downhole tool 300. In some embodiments, the anchoring feature 216 includes the first anchoring feature 216 disposed on the inner sleeve 214 and a corresponding second anchoring feature 306 disposed on the second downhole tool 300. For example, in the illustrated embodiment, the inner sleeve 214 comprises a collet. Specifically, the radially inner surface 536 of the inner sleeve 214 may be shaped to form a collet configured to receive the second downhole tool 300. The first mating portion 502 of the stepped mating end 500 of the downhole tool may form a locking profile configured to secure within the collet. However, the second downhole tool 300 may be secured to the inner sleeve 214 via any suitable anchoring feature 216 (e.g., keys, radial dogs, ratch-latch, versa-latch, etc.).

FIG. 6 illustrates a cross-sectional view of the first downhole tool 200 coupled with the second downhole tool 300 in the second position 600, in accordance with one or more embodiments. As set forth above, the second downhole tool 300 may be anchored to the inner sleeve 214 of the travel joint 50 via an anchoring feature 216 to couple the second downhole tool 300 to the first downhole tool 200. The inner sleeve 214 of the travel joint 50 may move axially between the first position 516 (shown in FIG. 5) and the second position 600 with respect to the outer sleeve 302, thereby allowing relative movement between the first downhole tool 200 and second downhole tool 300 while coupled.

The travel joint 50 may include a dampener 602 (e.g., dampening device, shock absorber, etc.) such as a dashpot for damping movement of the inner sleeve 214 with respect to the outer sleeve 302. Further, the dampener 602 may absorb and eliminate vibrations in the tubing strings, sensors, controllers, control lines, connections, and/or other devices/components of the first downhole tool 200, the second downhole tool 300, and/or the completion system 10. As the second downhole tool 300 is secured (e.g., rigidly secured) to the inner sleeve 214, such damping may also dampen movement between the first downhole tool 200 and the second downhole tool 300. Damping may reduce strain on the first downhole tool 200 and/or the second downhole tool 300. In the illustrated embodiment, the dampener 602 is secured to the outer surface 528 of the axially moveable inner sleeve 214 and extends radially outward toward the inner surface 518 of the outer sleeve 302. Further, the dampener 602, may have at least one orifice 604 configured to restrict flow of oil. As the inner sleeve 214 moves, the restricted flow of oil through the orifice 604 may control (e.g., slow) a rate of movement of the inner sleeve 214 with respect to the outer sleeve 302. Controlling such movement further controls movement between the first downhole tool 200 and the second downhole tool 300 due to the rigid connection between the second downhole tool 300 and the inner sleeve 214.

Fluid-structure interactions (e.g., fluids impacting against internal shoulders, etc.) are sources of failures within well systems such as completion system 10. The failures may stem from turbulence-induced vibrations, fluid hammer, vortex shedding, cavitation-induced vibrations and others. Intelligent Completion systems, with flow-control valves, flow-meters, control lines and/or sensors can suffer from these types of failures. In multilateral wells, flow-induced failures may be exacerbated when multiple flow regimes are combined. For example, when the flow from the lower lateral wellbore 20B is combined with flow from the lower mainbore. The combination of vibrations may have detrimental effect upon the lower multilateral junction 40B and other components of the completion system 10. For example, the vibrations from one flow stream and another flow stream may combine such that the two vibrations may become superposed (e.g., stacked one on top of the other) so that the resultant amplitude is the sum of the two contributing amplitudes, which can be highly destructive. It is important to note that the dampener 602 (e.g., dashpot) is not a spring. Indeed, a spring is an elastic object that stores mechanical energy and releases it when the opposing force is removed. A dashpot (dampening device, shock absorber, etc.) limits travel or motion, absorbs energy and reduces vibrations. Accordingly, the integration of the dampener 602 into the travel joint will reduce vibrations, absorb shocks, and limit travel/motion in the completion system 10 and related components.

Figure 7:
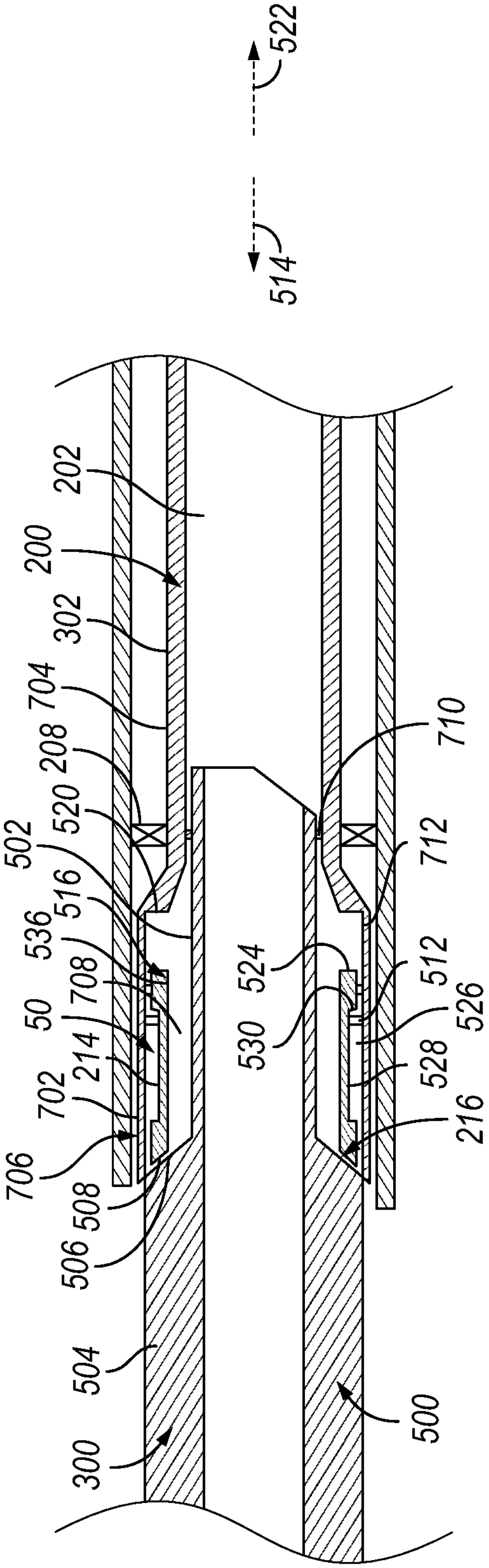
FIG. 7 illustrates a cross-sectional view of another embodiment of the first downhole tool having a travel joint positioned above a packer and coupled with the second downhole tool in the first position, in accordance with one or more embodiments.

FIG. 7 illustrates a cross-sectional view of another embodiment of the first downhole tool 200 having a travel joint 50 positioned above the first anchoring device 208 (e.g., a packer assembly) and coupled with the second downhole tool 300 in the first position 516, in accordance with one or more embodiments. As illustrated, the outer sleeve 302 of the first downhole tool 200 may have a stepped receiving end 700 with a first receiving portion 702 and a second receiving portion 704. The first receiving portion 702, disposed at an upper axial end 706 of the outer sleeve 302, may have a larger diameter than the second receiving portion 704 such that the outer sleeve shoulder 520 is formed at the transition from the first receiving portion 702 to the second receiving portion 704.

Further, as set forth above, the second downhole tool 300 may include the stepped mating end 500, having the first mating portion 502 and the second mating portion 504, for insertion into the through bore 202 defined by the outer sleeve 302. The first mating portion 502 may have a smaller outer diameter than the second mating portion 504 such that the stepped mating end 500 forms the second tool shoulder 506 at a transition from the first mating portion 502 to the second mating portion 504. The second tool shoulder 506 may be configured to interface with the first axial end 508 of the inner sleeve 214 of the travel joint 50 when the second downhole tool 300 is coupled to the inner sleeve 214 of the first downhole tool 200. Further, the anchoring feature 216 may be configured to anchor the second tool shoulder 506 with the first axial end 508 of the inner sleeve 214 to couple the second downhole tool 300 to the inner sleeve 214. However, the inner sleeve 214 and/or the second downhole tool 300 may include alternative and/or additional anchoring features 216 to secure the second downhole tool 300 to the inner sleeve 214.

Moreover, the outer diameter of the second mating portion 504 may be substantially similar to the inner diameter of the first receiving portion 702 of the outer sleeve 302 of the first downhole tool 200, and the outer diameter of the first mating portion 502 may be substantially similar to the inner diameter of the second receiving portion 704 of the outer sleeve 302. In the illustrated embodiment, an annular gap 708 is formed between the inner surface 536 of the inner sleeve 214 and the first mating portion 502. In some embodiments, Control Line (not shown) may be at least partially coiled within 702, inside outer sleeve 302 (in an enlarge inner diameter are—below no-go should 520, or other places. However, in some embodiments, the outer diameter of the first mating portion 502 may be substantially similar to the inner diameter of the inner sleeve 214.

In the illustrated embodiment, the first mating portion 502 may be disposed in the through bore 202 defined by the second receiving portion 704 along the entire travel path of the inner sleeve 214 (e.g., between the first position 516 and the second position 600). The first mating portion 502 may include a seal feature 710 configured to form a seal between the first mating portion 502 of the second downhole tool 300 and the second receiving portion 704 of the outer sleeve 302 of the first downhole tool 200. As the first mating portion 502, may be disposed in the second receiving portion 704 along the entire travel path of the inner sleeve 214, the seal feature 710 may maintain the seal throughout production operations regardless the position of the inner sleeve 214 once the second downhole tool 300 is coupled to the first downhole tool 200.

Moreover, the travel joint 50 may be disposed in the through bore 202 defined by the first receiving portion 702. As set forth above, the travel joint 50 has the inner sleeve 214 that slides axially with respect to an outer sleeve 302 of the first downhole tool 200. In the illustrated embodiment, the travel joint 50 further includes the axial stop 512 to restrain axial movement of the inner sleeve 214 in a first direction 514 (e.g., uphole direction) at the first position 516. The axial stop 512 may be secured to an inner surface 712 first receiving portion 702 of the outer sleeve 302 and extend into the through bore 202 defined by the first receiving portion 702. However, in some embodiments, the axial stop 512 may be formed, or secured, in the first receiving portion 702 of the outer sleeve 302. Further, the inner sleeve 214 may include the travel slot 526 formed in the outer surface 528 of the inner sleeve 214. The first travel slot end 530 may contact the axial stop 512 at the first position 516 to restrain axial movement of the inner sleeve 214 in the first direction 514 (e.g., uphole direction).

The outer sleeve shoulder 520, formed at the transition from the first receiving portion 702 to the second receiving portion 704, may restrain axial movement of the inner sleeve 214 in a second direction 522 (e.g., downhole direction) at the second position 600. The second axial end 524 of the inner sleeve 214 may contact the outer sleeve shoulder 520 in the second position 600 to restrain axial movement of the inner sleeve 214 in the second direction 522. As such, the axial stop 512 and the outer sleeve shoulder 520 may restrain movement of the inner sleeve 214 between the first position 516 and the second position 600. However, the inner sleeve 214 may additionally or alternatively be restrained via shoulders, stop blocks, pins, or other suitable features, defined in the outer sleeve 302 and/or inner sleeve 214.

Accordingly, the present disclosure may provide a sliding connector, system, and method for allowing relative movement between connected downhole tools. The tools, in some embodiments, comprise an energy transfer mechanism to transfer energy (power and/or communication) from one tool to another. The travel joint may allow axial (e.g., linear) relative movement between connected downhole tools while maintaining fluid and energy transfer capabilities between the connected tools. The methods/systems/compositions/tools may include any of the various features disclosed herein, including one or more of the following statements.

Statement 1. An apparatus for downhole connection of well components may comprise a first tubular component defining a through bore for receiving a second tubular component; and a travel joint including an axially moveable inner sleeve and a coupling feature configured for coupling the second tubular component with the inner sleeve when received in the through bore of the first tubular component.

Statement 2. The apparatus of statement 1, further comprising: a first completion system comprising the first tubular component; and a second completion system comprising the second tubular component, wherein the connection travel joint allows for axial alignment between the first and second completion systems.

Statement 3. The apparatus of statement 1 or statement 2, wherein the second completion system is deployable after installation of the first completion system downhole into connection with the first completion system.

Statement 4. The apparatus of statement of any preceding statement, wherein the first tubular component comprises a deflector assembly defining the through bore and the second tubular component comprises a multilateral junction comprising a main bore leg for being received into the through bore.

Statement 5. The apparatus of statement of any preceding statement, wherein the first tubular component comprises an additional component, and wherein the main bore leg extends through the deflector assembly, via the through bore, to connect with the additional component.

Statement 6. The apparatus of statement of any preceding statement, further comprising: a first energy transfer coupler disposed on the inner sleeve of the first tubular component; and a second energy transfer coupler connectable with the first energy transfer coupler in response to receiving the second tubular component in the through bore of the first tubular component to establish energy transfer capabilities between the first and second tubular components, wherein the coupling feature of the travel joint maintains relative position between the first and second energy transfer couplers while allowing relative movement between the first and second tubular components.

Statement 7. The apparatus of statement of any preceding statement, wherein one or both of the first and second energy transfer couplers comprise contactless couplers.

Statement 8. The apparatus of statement of any preceding statement, further comprising: an energy transfer control line connected to the first energy transfer coupler, the control line including a coiled section to allow axial travel of the inner sleeve without damaging the control line.

Statement 9. The apparatus of statement of any preceding statement, wherein the energy transfer control line provides energy communication signal and/or power transfer to/from a first completion section comprising the first tubular component, a second completion section comprising the second tubular component, a flow control assembly, a sensor, a valve, another energy transfer coupling, control line, energy storage device, data storage device, computer, energy convertor, or combinations thereof.

Statement 10. The apparatus of statement of any preceding statement, further comprising: a sealing member for establishing sealed fluid communication between the through bore of the first tubular component and a through bore of the second tubular component when the second tubular component is coupled with the inner sleeve.

Statement 11. The apparatus of statement of any preceding statement, wherein the through bore of the first tubular component and the through bore of the second tubular component remain in sealed fluid communication throughout a full range of travel of the inner sleeve within the first tubular component.

Statement 12. The apparatus of statement of any preceding statement, further comprising a dampener for damping relative movement between the first tubular component and the axially moveable inner sleeve of the travel joint to dampen relative movement and vibrations between the first tubular component and the second tubular component.

Statement 13. The apparatus of statement of any preceding statement, wherein the dampener is secured to an outer surface of the axially moveable inner sleeve of the travel joint and extends radially outward to seal against an inner surface of the first tubular component, and wherein the dampener comprises at least one orifice configured to restrict flow and control a rate of movement between the first and second tubular components using a restricted flow of oil through an orifice.

Statement 14. The apparatus of statement 1-3 and 6-14, wherein the first or second tubular component comprises a completion system positioned at least partially in a lateral wellbore of a multilateral well.

Statement 15. An apparatus for downhole connection of well components may comprise a first tubular component defining a through bore for receiving a second tubular component, wherein the first tubular component comprises a deflector assembly and an additional component, the deflector assembly defining a first part of the through bore and the additional component defining a second portion of the through bore, and wherein the second tubular component comprises a multilateral junction having a main bore leg that extends through the deflector assembly, via the through bore, to connect with the additional component; and a travel joint having an axially moveable inner sleeve configured to slide along the additional component and a coupling feature configured to couple the main bore leg of the second tubular component with the inner sleeve, wherein coupling the main bore leg with the inner sleeve slidably connects the main bore leg with the additional component.

Statement 16. A method of connecting tubular components downhole may comprise lowering a first tubular component into a well; receiving a second tubular component into a through bore of the first tubular component; and coupling the first and second tubular components with a travel joint in the through bore of the first tubular component, including coupling the second tubular component with an axially moveable inner sleeve of the travel joint, thereby allowing relative movement between the first and second tubular components while coupled.

Statement 17. The method of statement 16, further comprising: installing a first completion system comprising the first tubular component; and installing a second completion system comprising the second tubular component, wherein the travel joint allows for axial alignment between the first and second completion systems.

Statement 18. The method of statement 16 or statement 17, further comprising: connecting a first energy transfer coupler on the inner sleeve of the first tubular component with a second energy transfer coupler disposed on the second tubular component in to establish energy transfer between the first and second tubular components, wherein the coupling maintains relative position between the first and second energy transfer couplers while allowing relative movement between the first and second tubular components.

Statement 19. The method of any of statements 16-18, wherein the through bore of the first tubular component and a through bore of the second tubular component remain in sealed fluid communication throughout a full range of travel of the inner sleeve within the first tubular component.

Statement 20. The method of any of statements 16-19, further comprising: damping relative movement of the inner sleeve of the travel joint to dampen movement and vibrations between the first tubular component and the second tubular component.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. An apparatus for downhole connection of well components, comprising:

a first tubular component defining a through bore for receiving a second tubular component;

a travel joint including an axially moveable inner sleeve and a coupling feature configured for coupling the second tubular component with the inner sleeve when received in the through bore of the first tubular component;

a first energy transfer coupler disposed on the inner sleeve; and a second energy transfer coupler connectable with the first energy transfer coupler in response to receiving the second tubular component in the through bore of the first tubular component to establish energy transfer capabilities between the first and second tubular components, wherein the coupling feature of the travel joint maintains relative position between the first and second energy transfer couplers while allowing relative movement between the first and second tubular components.

2. The apparatus of claim 1, further comprising:

a first completion system comprising the first tubular component; and a second completion system comprising the second tubular component, wherein the connection travel joint allows for axial alignment between the first and second completion systems.

3. The apparatus of claim 2, wherein the second completion system is deployable after installation of the first completion system downhole into connection with the first completion system.

4. The apparatus of claim 1, wherein the first tubular component comprises a deflector assembly defining the through bore and the second tubular component comprises a multilateral junction comprising a main bore leg for being received into the through bore.

5. The apparatus of claim 4, wherein the first tubular component comprises an additional component, and wherein the main bore leg extends through the deflector assembly, via the through bore, to connect with the additional component.

6. The apparatus of claim 1, wherein one or both of the first and second energy transfer couplers comprise contactless couplers.

7. The apparatus of claim 6, wherein the energy transfer control line provides energy communication signal and/or power transfer to/from a first completion section comprising the first tubular component, a second completion section comprising the second tubular component, a flow control assembly, a sensor, a valve, another energy transfer coupling, control line, energy storage device, data storage device, computer, energy convertor, or combinations thereof.

8. The apparatus of claim 1, further comprising:

an energy transfer control line connected to the first energy transfer coupler, the control line including a coiled section to allow axial travel of the inner sleeve without damaging the control line.

9. The apparatus of claim 8, wherein the through bore of the first tubular component and the through bore of the second tubular component remain in sealed fluid communication throughout a full range of travel of the inner sleeve within the first tubular component.

10. The apparatus of claim 9, wherein the dampener is secured to an outer surface of the axially moveable inner sleeve of the travel joint and extends radially outward to seal against an inner surface of the first tubular component, and wherein the dampener comprises at least one orifice configured to restrict flow and control a rate of movement between the first and second tubular components using a restricted flow of oil through an orifice.

11. The apparatus of claim 1, further comprising:

a sealing member for establishing sealed fluid communication between the through bore of the first tubular component and a through bore of the second tubular component when the second tubular component is coupled with the inner sleeve.

12. The apparatus of claim 1, further comprising a dampener for damping relative movement between the first tubular component and the axially moveable inner sleeve of the travel joint to dampen relative movement and vibrations between the first tubular component and the second tubular component.

13. The apparatus of claim 1, wherein the first or second tubular component comprises a completion system positioned at least partially in a lateral wellbore of a multilateral well.

14. An apparatus for downhole connection of well components, comprising:

a first tubular component defining a through bore for receiving a second tubular component, wherein the first tubular component comprises a deflector assembly and an additional component, the deflector assembly defining a first part of the through bore and the additional component defining a second portion of the through bore, and wherein the second tubular component comprises a multilateral junction having a main bore leg that extends through the deflector assembly, via the through bore, to connect with the additional component;

a travel joint having an axially moveable inner sleeve configured to slide along the additional component and a coupling feature configured to couple the main bore leg of the second tubular component with the inner sleeve, wherein coupling the main bore leg with the inner sleeve slidably connects the main bore leg with the additional component;

a first energy transfer coupler disposed on the inner sleeve; and a second energy transfer coupler connectable with the first energy transfer coupler in response to receiving the second tubular component in the through bore of the first tubular component to establish energy transfer capabilities between the first and second tubular components, wherein the coupling feature of the travel joint maintains relative position between the first and second energy transfer couplers while allowing relative movement between the first and second tubular components.

15. A method of connecting tubular components downhole, the method comprising:

lowering a first tubular component into a well;

receiving a second tubular component into a through bore of the first tubular component;

coupling the first and second tubular components with a travel joint in the through bore of the first tubular component, including coupling the second tubular component with an axially moveable inner sleeve of the travel joint, thereby allowing relative movement between the first and second tubular components while coupled; and connecting a first energy transfer coupler on the inner sleeve with a second energy transfer coupler disposed on the second tubular component to establish energy transfer between the first and second tubular components, wherein the coupling maintains relative position between the first and second energy transfer couplers while allowing relative movement between the first and second tubular components.

16. The method of claim 15, further comprising:

installing a first completion system comprising the first tubular component; and installing a second completion system comprising the second tubular component, wherein the travel joint allows for axial alignment between the first and second completion systems.

17. The method of claim 15, wherein the through bore of the first tubular component and a through bore of the second tubular component remain in sealed fluid communication throughout a full range of travel of the inner sleeve within the first tubular component.

18. The method of claim 15, further comprising:

damping relative movement of the inner sleeve of the travel joint to dampen movement and vibrations between the first tubular component and the second tubular component.

19. An apparatus for downhole connection of well components, comprising:

a first tubular component defining an outer surface for receiving a second tubular component;

a travel joint including an axially moveable outer sleeve and a coupling feature configured for coupling the second tubular component with the outer sleeve when received by the first tubular component;

a first energy transfer coupler disposed on the outer surface of the first tubular component; and a second energy transfer coupler connectable with the first energy transfer coupler in response to receiving the second tubular component by the first tubular component to establish energy transfer capabilities between the first and second tubular components, wherein the coupling feature of the travel joint maintains relative position between the first and second energy transfer couplers while allowing relative movement between the first and second tubular components.

20. A method of connecting tubular components downhole, the method comprising:

lowering a first tubular component into a well;

receiving a second tubular component into an outer surface of the first tubular component;

coupling the first and second tubular components with a travel joint on the outer surface of the first tubular component, including coupling the second tubular component with an axially moveable outer sleeve of the travel joint, thereby allowing relative movement between the first and second tubular components while coupled; and connecting a first energy transfer coupler on the outer surface of the first tubular component with a second energy transfer coupler disposed on the second tubular component to establish energy transfer between the first and second tubular components, wherein the coupling maintains relative position between the first and second energy transfer couplers while allowing relative movement between the first and second tubular components.

* * * * *